Sept. 13, 1966  J. A. RIETDIJK  3,272,089
DEVICE FOR COMPRESSING OR EXPANDING A MEDIUM
Filed Nov. 12, 1964
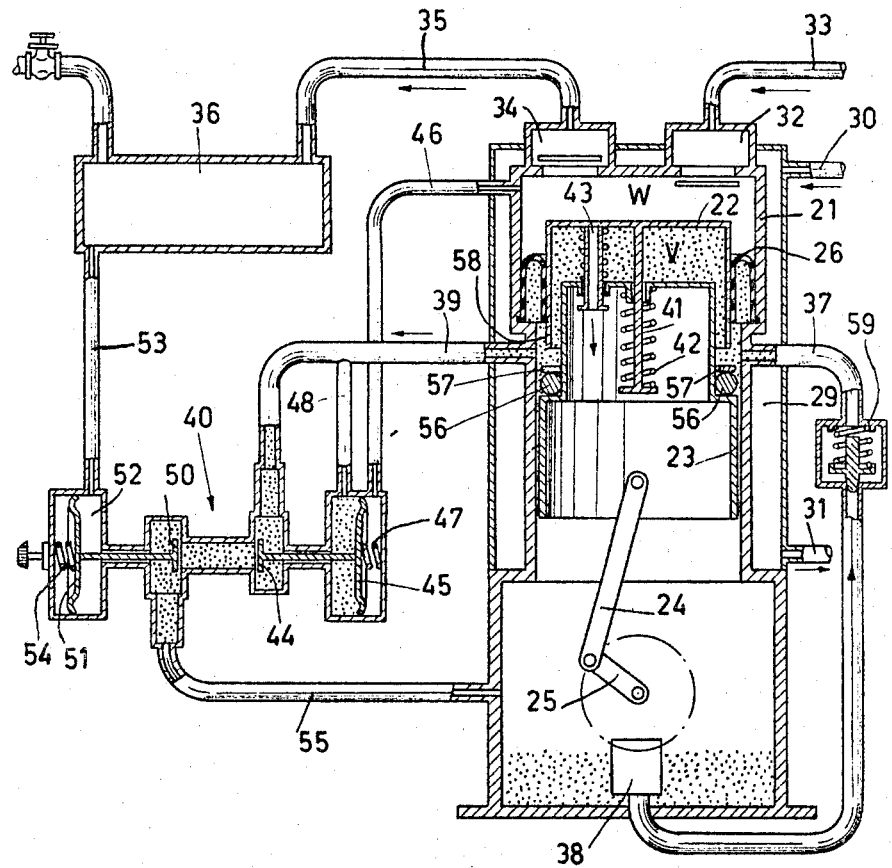
INVENTOR.
JOHAN A. RIETDIJK
BY
AGENT

United States Patent Office 3,272,089
Patented Sept. 13, 1966

3,272,089
DEVICE FOR COMPRESSING OR EXPANDING A MEDIUM
Johan Adriaan Rietdijk, Emmasingel, Eindhoven, Netherlands, assignor to North American Philips Company, Inc., New York, N.Y., a corporation of Delaware
Filed Nov. 12, 1964, Ser. No. 410,664
Claims priority, application Netherlands, Nov. 15, 1963, 300,572
3 Claims. (Cl. 92—83)

The invention relates to a device for the compression or the expansion of a medium. Such devices are, for example, compressors, expansion machines, cold-gas refrigerators, thermodynamic engines and so on.

Object of this invention is to provide an improved construction of this kind of devices.

The device according to the invention comprises at least one cylinder in which a piston-like body is adapted to reciprocate for varying the volume of a working space, said piston-like body having its side remote from the working space joining a liquid column, which in turn engages a second piston-like body coupled with the driving gear. The seal between the first-mentioned piston-like body and the wall of the cylinder being formed by one or more rolling membranes, each engaging, at least on one side a liquid. There is further provided means for maintaining at least during each stroke a substantially constant pressure difference on each of the rolling membranes, while the first-mentioned piston-like body is provided with a sheath-like element extending towards the second piston-like body. The latter supports an elastically deformable sealing element which extends in the axial direction over part of the circumference of the piston-like body and has an outer diameter which is smaller than the inner diameter of the cylinder wall. The length of the sheath-like element is such that, at the minimum permissible distance between the piston-like bodies the sheath-like element deforms the sealing element to an extent such that a seal is obtained between the two piston-like bodies and the cylinder wall.

The device according to the invention has the advantage that the use of a rolling membrane provides an absolute seal of the working space. It is thus absolutely impossible for lubricant particles or other impurities to penetrate along the piston into the working space.

In a known sealing device the rolling membrane engages, on one side, a liquid contained in a space having, in operation, a constant volume. If, however, for some reason or other, during operation the quantity of liquid in said space differs from the predetermined quantity, a variation in the pressure difference on the rolling membrane ensues, so that the membrane is stretched to a greater or lesser extent.

In accordance with the invention one side of the rolling membrane engages a liquid column between the two piston-like bodies, while means such as elastic members acting upon the pistons are provided for maintaining a pressure difference on the rolling membrane. When the quantity of liquid between the piston-like bodies varies slightly, the result will only be a variation of the distance between the two piston-like bodies, while the pressure difference on the rolling membrane does substantially not vary. This results in a prolongation of the lifetime of the rolling membrane.

A further advantage of the presence of a liquid column between the two piston-like bodies is that by means of a variation of the quantity of liquid between said pistons the distance betwen them can be varied at will. This results in that the clearance of the working space is enlarged or reduced. By comparatively simple means this provides a possibility of controlling the clearance space.

When the distance between the two piston-like bodies is varied, the pressure difference on the rolling membrane will vary slightly within narrow limits. When the distance exceeds the maximum permissible distance, a regulating member ensures that liquid can flow away, so that no further increase in distance between the pistons will occur. When the distance becomes too small, the regulating member closes the liquid outlet, so that no liquid can any longer flow away through the regulating member. However, there is still the possibility of liquid leaking away along the second piston-like body. This is avoided in accordance with the invention by providing the first piston-like body with a sheath-like element which, at the minimum distance between the two piston-like bodies deforms the sealing element connected with the second piston-like body to an extent such that this element is urged against the cylinder wall. This ensures a satisfactory seal between the second piston-like body and the cylinder wall.

This construction is particularly important for maintaining a pressure difference on the rolling membrane when the device remains motionless. In this state usually also the liquid supply members for the space between the two pistons are no longer operative, so that by liquid leakage the pressure difference on the rolling membrane might assume an inadmissible value.

An additional advantage of the construction according to the invention is that in operation part of the liquid between the two piston-like bodies can flow away through the gap between the second piston-like body and the cylinder wall, so that this piston-like body is always satisfactorily lubricated. The second piston need not be machined accurately to measure.

In a further advantageous embodiment of the invention the sealing element is formed by an O-shaped ring.

In a further embodiment of the device according to the invention the sealing element is protected by an annular, non-deformable element which is adapted to cooperate with the sheath-like element.

The invention will be described more fully with reference to the drawing which shows diagrammatically by way of example, a compressor.

In the drawing reference number 21 designates a cylinder, in which two piston-like bodies 22 and 23 are adapted to move. The seal between the piston 22 and the cylinder 21 is obtained by means of a rolling membrane 26. The piston 23 is connected through a driving rod 24 with a crank 25. The cylinder 21 is surrounded by a cooling jacket 29, with which communicate a supply duct 30 and an outlet duct 31 for the cooling water. The compression space W communicates through an inlet valve 32 with a medium supply duct 33 and through an outlet valve 34 with a medium outlet duct 35. The medium outlet duct 35 opens out in a buffer space 36. The space V between the pistons 22 and 23 is filled with liquid. With this space communicates a liquid supply duct 37, which communicates at the other end with a liquid pump 38. The space V communicates furthermore with a liquid outlet duct 39, which opens out in the regulating member 40. The piston 22 is provided with a guiding rod 41, which is surounded by a pressure spring 42, which urges the piston 22 against the liquid in the space V. The device comprises furthermore a regulating valve 43, which determines the maximum height of the liquid column in the space V.

The regulator 40 comprises a valve 44, which can block the liquid outlet duct 39. The valve 44 is connected with a membrane 45. The space on the right-hand side of said membrane communicates through a duct 46 with the space W. On the right-hand side of this membrane is subjected to a pressure spring 47. The space on the left-hand side of the membrane 45 communicates through a narrow duct 48 and a duct 39 with the space V. The membrane 45 is thus subjected to the same average pressure difference as the rolling membrane 26. The pressure spring 47 is chosen so that this pressure difference may arise to a few atmospheres, before the valve 44 is opened.

The regulator 40 comprises a second valve 50, which is connected with a membrane 51. The space 52 on the right-hand side of the membrane 51 communicates through a duct 53 with the buffer vessel 36. On the left-hand side a spring 54, the force of which may be variable, exerts a force on the membrane 51.

The piston 23 is provided with an O-shaped ring 56, which has such an outer diameter that in normal operation it does not touch the cylinder wall 21. Above the O-shaped ring there is arranged an annular plate 57, which is movable relatively to the piston 23. The piston 22 is provided on its side facing the piston 23 with the sheath-like element 58.

The device operates as follows. The oil pump 38 supplies liquid through the duct 37 to the space V. The distance between the pistons 22 and 23 will thus increase. The valve 43 follows the upward movement of the piston 22 until it touches the lower side of the piston 23. When the piston 22 moves further upwards, the valve 43 is no longer in contact with its upper side with the piston 22 and the liquid can flow through the valve 43 back to the crank case. The piston 22 then has reached its topmost position, in which the clearance space of the compressor is at a minimum and the effect is at a maximum. The spring 42 ensures that a pressure difference of a few atmospheres prevails between the pressure of the liquid and the pressure in the working space W. Thus the rolling membrane 26 remains taut. Also in the topmost position the pump continues supplying liquid, which leaves the space V again through the valve 43. This provides a constant flow through the space V. This is advantageous for two reasons. In the first place the concentration of medium diffused through the rolling membrane in the liquid of the space V is prevented from becoming too high. Secondly, a satisfactory cooling of the piston 22 and the rolling membrane 26 is obtained.

Part of the liquid supplied to the space V will not leave this space through the valve 43, but since the O-shaped ring 56 is not in contact with the cylinder wall 21, it can flow through the gap between the piston 23 and the cylinder wall 21 back into the crank case. This provides a satisfactory lubrication of the piston 23, which thus travels completely in liquid.

When the pressure in the buffer vessel 36 is too high, the effect of the compressor automatically decreases, since the pressure in the buffer vessel 36 and hence also in the space 52 becomes too high and the membrane 51 is moved to the left against the pressure of the spring 54. The valve 50 is thus lifted from its seat. The valve 44 is always open in normal operation. Thus liquid can flow through the duct 39 and the valve 50 into the liquid return duct 55. This results in that the distance between the pistons 22 and 23 diminishes so that the clearance space increases and the effect decreases.

In order to avoid an excessively small pressure difference between the media in the spaces V and W, the valve 44 is provided. With an excessively small pressure difference the spring 47 closes the valve 44, so that along this path no liquid can flow any longer out of the space V. However, if no special precautions were taken, liquid could still flow out of the space V through the gap between the piston 23 and the cylinder 21. This is avoided by providing the piston 22 with the sheath-like element 58, which, at a minimum permissible distance between the pistons 22 and 23 exerts a pressure on the annular plate 57 so that the O-shaped ring 56 is deformed to an extent such that it engages the cylinder wall 21. Thus a complete seal of the space V is obtained, so that no liquid can flow any longer out of said space and the pressure difference on the rolling membrane 26 does no longer decrease.

The said measures are particularly important for stopping the operation of the device, when the liquid pump 38 is also put out of operation, so that no liquid is any longer supplied to the space V. In order to avoid a return of liquid from the space V through the pump to the crank case, the liquid supply duct is provided with a return valve 59. When a small quantity of liquid flows out of the space V for example through the valve 43 or through the gap between the piston 23 and the cylinder wall 21, the regulator will close the duct 39 while also the valve 43 is closed. However, still a small quantity of liquid can flow away along the piston 23. This means that the distance between the pistons 22 and 23 diminishes gradually. During this decrease the pressure difference maintained by the spring 42 will also diminish. When the pressure difference on the rolling membrane 26 becomes too small, folds will occur in the rolling membrane and in the extreme case even the complete pressure prevailing in the space W will be exerted on the rolling membrane. When the device is started again, this would directly give rise to break-down of the rolling membrane. The sheath-like element 58 is constructed so that, when the distance between the pistons 22 and 23 reaches its minimum permissible value, this element comes into contact with the annular plate 57, so that the O-shaped ring 56 is deformed and the gap between the piston 23 and the cylinder 21 is completely closed. The space V is then completely sealed and no liquid can any longer flow out of it. The rolling membrane thus remains in the stretched state even when the machine is inoperative.

It will be obvious that a different, elastically deformable sealing element instead of an O-shaped ring may be employed. The sole requirement for such a sealing element is that, when deformed, it should be urged against the cylinder wall.

An advantage of the construction depicted above is, in addition, that in operation the sealing element is not in contact with the cylinder wall so that this element is not subjected to wear.

Although the drawing shows by way of example a compressor, it will be obvious that the piston combination according to the invention may also be employed in cold-gas refrigerators and thermodynamic engines.

What is claimed is:

1. A device for compressing and expanding a medium comprising cylinder means, first and second piston-like bodies adapted to reciprocate in said cylinder means, a driving gear connected to said second piston-like body, said cylinder means and said first piston-like body defining a work space, said first piston-like body varying the volume of said work space when the same is reciprocated, a liquid column between said first and second piston-like bodies and engaging the side of said first piston-like body remote from said work space, a rolling membrane seal between said first piston-like body and said cylinder means and being in contact at least on one side thereof with said liquid column, means for maintaining a pressure difference on said rolling membrane that is substantially constant, said first piston-like body being provided with a sheath-like element extending in the direction of said second piston-like body, and a resilient, deformable sealing element at least partially surrounding said second piston-like body and which has an outer diameter that is smaller than the inner diameter of the adjacent wall of said cylinder means, said sheath-like element having such a length that at the minimum permissible distance between said two piston-like bodies said sheath-like element deforms said sealing element whereby a seal is effected between said second piston-like body and the adjacent wall of the cylinder means.

2. A device for compressing and expanding a medium as claimed in claim 1 wherein said sealing element is an O-shaped ring.

3. A device for compressing and expanding a medium comprising cylinder means, first and second piston-like bodies adapted to reciprocate in said cylinder means, a driving gear connected to said second piston-like body, said cylinder means and said first piston-like body defining a work space, said first piston-like body varying the volume of said work space when the same is reciprocated, a liquid column between said first and second piston-like bodies and engaging the side of said first piston-like body remote from said work space, a rolling membrane seal between said first piston-like body and said cylinder means and being in contact at least on one side thereof with said liquid column, means for maintaining a pressure difference on said rolling membrane that is substantially constant, said first piston-like body being provided with a sheath-like element extending in the direction of said second piston-like body, a resilient, deformable sealing element at least partially surrounding said second piston-like body and which has an outer diameter that is smaller than the inner diameter of the adjacent wall of said cylinder means and an annular, non-deformable member between said sealing element and said sheath-like element adapted to be moved by the latter relative to said second piston-like body.

References Cited by the Examiner
UNITED STATES PATENTS

| | | | |
|---|---|---|---|
| 781,054 | 1/1905 | Donahoe | 137—625.26 |
| 2,614,793 | 10/1952 | Storm | 103—178 |
| 3,043,338 | 7/1962 | Hanson | 92—99 |
| 3,204,858 | 7/1965 | Dros | 92—60 X |

MARTIN P. SCHWADRON, *Primary Examiner.*

EDGAR W. GEOGHEGAN, *Examiner.*

I. C. COHEN, *Assistant Examiner.*